(12) United States Patent  
Monbetsu

(10) Patent No.: US 8,850,099 B2  
(45) Date of Patent: Sep. 30, 2014

(54) REDUNDANT DATA BUS SYSTEM INCLUDING MULTIPLE TRANSMISSION PATHS

(75) Inventor: Yoshinobu Monbetsu, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 320 days.

(21) Appl. No.: 13/351,501

(22) Filed: Jan. 17, 2012

(65) Prior Publication Data

US 2012/0185635 A1    Jul. 19, 2012

(30) Foreign Application Priority Data

Jan. 19, 2011    (JP) ................................. 2011-008604  
Nov. 17, 2011    (JP) ................................. 2011-251338

(51) Int. Cl.
*G06F 13/00*        (2006.01)  
*G06F 11/20*        (2006.01)  
*G06F 13/40*        (2006.01)

(52) U.S. Cl.  
CPC ........ *G06F 11/2007* (2013.01); *G06F 13/4022* (2013.01); *G06F 11/2005* (2013.01)  
USPC .......................................................... 710/316

(58) Field of Classification Search  
CPC    G06F 13/4022; G06F 13/4027; G06F 13/385  
USPC ...................................... 710/306–317, 36–38  
See application file for complete search history.

(56) References Cited

U.S. PATENT DOCUMENTS 7,020,790 B2 *    3/2006    Mares ........................... 713/340  
2007/0268973 A1 *    11/2007    Fanson ........................... 375/257  
2009/0044041 A1    2/2009    Armbruster et al.  
2013/0181528 A1 *    7/2013    Colombi et al. ................. 307/65

FOREIGN PATENT DOCUMENTS

JP    2008-505012 A    2/2008

* cited by examiner

*Primary Examiner* — Raymond Phan  
(74) *Attorney, Agent, or Firm* — Global IP Counselors, LLP

(57) ABSTRACT

There are configured a first transmission path, along which data is transmitted/received between a controller and a first microcomputer through a first driver, and a second transmission path, along which data is transmitted/received between the controller and the first microcomputer through a second driver. The controller transmits an operation check signal to the first microcomputer through the first or second transmission path, and receives a response signal from the first microcomputer through the first or second transmission path.

3 Claims, 3 Drawing Sheets

REDUNDANT DATA BUS SYSTEM INCLUDING MULTIPLE TRANSMISSION PATHS

CROSS-REFERENCE TO RELATED APPLICATIONS

This application claims priority to Japanese Patent Application No. 2011-008604 filed on Jan. 19, 2011 and Japanese Patent Application No. 2011-251338 filed on Nov. 17, 2011. The entire disclosures of Japanese Patent Application Nos. 2011-008604 and 2011-251338 are hereby incorporated herein by reference.

BACKGROUND

1. Technical Field

The present invention relates to a redundant data bus system.

2. Related Art

Conventionally, there have been known redundant data bus systems provided with a plurality of buses, and a control device or a similar component connected to each of the buses; wherein in an instance in which a fault develops in one of the bus pathways, a switch is made to another bus pathway (for example, see Japanese Patent Publication No. 2008-505012).

SUMMARY

In relation to a redundant data bus system device mentioned above as an example, or a similar device, there has been a demand for a system architecture in which it is possible to detect a fault; maintain the function of the data bus system; and, in an instance in which a fault develops, promptly specify the location of the fault so that recovery work can be performed in an efficient manner.

The present invention was conceived in order to resolve at least some of the above-mentioned problems, and can be realized as embodiments or examples of application as described below.

A redundant data bus system according to one aspect of the present invention includes a controller, a first microcomputer, a first data bus and a second data bus. Over the first data bus, the controller and the first microcomputer are connected via a first driver installed between the controller and the first microcomputer to form a first transmission path, along which data is transmitted/received between the controller and the first microcomputer via the first driver on the first data bus. Over the second data bus, the controller and the first microcomputer are connected via a second driver installed between the controller and the first microcomputer to form a second transmission path, along which data is transmitted/received between the controller and the first microcomputer through the second driver on the second data bus. The controller is configured to transmit, to the first microcomputer via the first transmission path or the second transmission path, the data including an operation check signal, and to receive, from the first microcomputer via the first transmission path or the second transmission path, the data including a response signal. The controller is further configured to make a switch to one of the first and second transmission paths through which the response signal has been transmitted when reception of the response signal is interrupted.

According to the configuration described above, an operation check signal is transmitted from the controller to the first microcomputer through the first and second transmission paths. Then, a response signal is transmitted from the first microcomputer to the controller through the first and second transmission paths. The controller receives a response signal from the first and second transmission paths, and can thereby check that the system is operating normally. In an instance in which no response signal is received from either the first or the second transmission path, it is determined that a defect has developed in the transmission path through which a response signal has not been received. In such an instance, a switch is made to a transmission path through which a response signal has been received, thereby making it possible to continue operating the system without stoppage. Also, since the first and the second drivers are installed on the first and second transmission paths, it is possible to detect the presence or absence of a response signal transmitted from the first microcomputer through the first transmission path and the second transmission path. A plurality of transmission paths and a plurality of drivers thus being provided make it possible to establish the location of a fault in detail. It is thereby possible to enhance the efficiency of repair work.

A redundant data bus system according to another aspect includes a second microcomputer. The first bus preferably connects the controller and the second microcomputer via a third driver installed between the controller and the second microcomputer to form a third transmission path along which data is transmitted/received between the controller and the second microcomputer via the third driver on the first data bus. The second bus preferably connects the controller and the second microcomputer via a fourth driver installed between the controller and the second microcomputer to form a fourth transmission path along which data is transmitted/received between the controller and the second microcomputer via the fourth driver on the second data bus. The controller is preferably further configured to transmit, to the second microcomputer via the third transmission path or the fourth transmission path, the data including an operation check signal, and to receive, from the second microcomputer through the third transmission path or the fourth transmission path, the data including a response signal. The controller is preferably further configured to make a switch to one of the third and fourth transmission paths through which the response signal has been transmitted when reception of the response signal is interrupted.

According to the configuration described above, the redundant data bus system further comprises the third transmission path, the fourth transmission path, the third driver, and the fourth driver. An operation check signal is transmitted from the controller to the second microcomputer through the third and fourth transmission paths. Then, a response signal is transmitted from the second microcomputer to the controller, again through the third and fourth transmission paths. The controller receives the response signal from the third and fourth transmission paths, and can thereby check that the system is operating normally. In an instance in which no response signal is received from either the third or the fourth transmission path, it is determined that a defect has developed in the transmission path through which a response signal has not been received. In such an instance, a switch is made to a transmission path through which a response signal has been received, thereby making it possible to continue operating the system without stoppage. Also, since the third and the fourth drivers are installed on the third and fourth transmission paths, it is possible to establish the location of defect in detail from the presence or absence of a response signal transmitted from the second microcomputer through the third transmission path and the fourth transmission path. It is thereby possible to enhance the efficiency of repair work and further enhance reliability.

In the redundant data bus system according to another aspect, the first microcomputer and the second microcomputer are preferably connected, and the first microcomputer and the second microcomputer preferably transmit/receive data with respect to each other According to the configuration described above, it is possible to reliably establish, from one microcomputer, that a defect has developed in the other microcomputer. Also, it becomes possible to transmit a response signal from one microcomputer to the controller through the other microcomputer, and the amount of data transmitted through the first and second data buses connected to the one microcomputer can be reduced.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
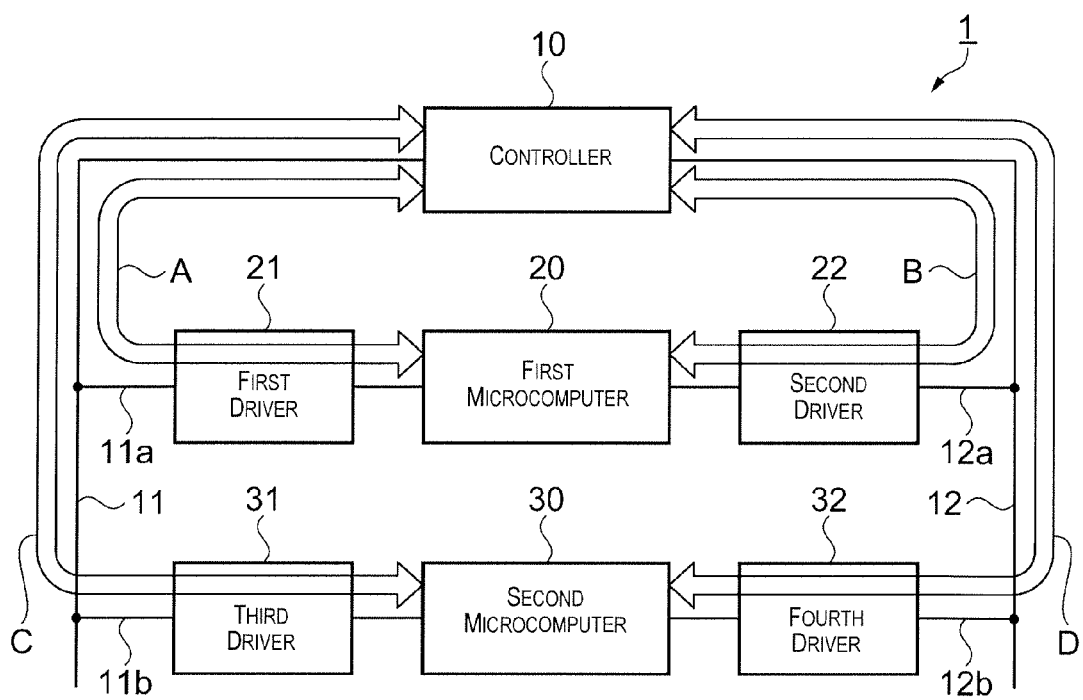
FIG. 1 is a block diagram showing a configuration of a redundant data bus system according to a first embodiment.

A first and a second embodiment of the present invention will now be described with reference to the accompanying drawings. In the drawings, the dimensions of layers and members are shown differently from reality so that the layers and members are sized so as to be visually identifiable.

First Embodiment

A configuration of a redundant data bus system will first be described. FIG. 1 is a block diagram showing a configuration of a redundant data bus system according to the present embodiment. As shown in FIG. 1, the redundant data bus system 1 according to the present embodiment comprises a controller 10; a first microcomputer 20; a second microcomputer 30; a first data bus 11 over which the controller 10 and the first microcomputer 20 are connected via a first driver 21 installed between the controller 10 and the first microcomputer 20, and over which the controller 10 and the second microcomputer 30 are connected via a third driver 31 installed between the controller 10 and the second microcomputer 30; and a second data bus 12 over which the controller 10 and the first microcomputer 20 are connected via a second driver 22 installed between the controller 10 and the first microcomputer 20, and over which the controller 10 and the second microcomputer 30 are connected via a fourth driver 32 installed between the controller 10 and the second microcomputer 30; wherein there are configured a first transmission path A, along which a data signal is transmitted/received between the controller 10 and the first microcomputer 20 through the first driver 21 on the first data bus 11; a second transmission path B, along which a data signal is transmitted/received between the controller 10 and the first microcomputer 20 through the second driver 22 on the second data bus 12; a third transmission path C, along which a data signal is transmitted/received between the controller 10 and the second microcomputer 30 through the third driver 31 on the first data bus 11; and a fourth transmission path D, along which a data signal is transmitted/received between the controller 10 and the second microcomputer 30 through the fourth driver 32 on the second data bus 12.

The controller 10 transmits a control signal or a similar signal to the first microcomputer 20 or the second microcomputer 30 through the first through fourth transmission paths A through D, thereby controlling the overall system.

The first microcomputer 20 and the second microcomputer 30 perform a predetermined calculation or a similar operation on the basis of the control signal from the controller 10.

The first data bus 11 and the second data bus 12 are transmission paths through which data is exchanged between the controller 10 and the first microcomputer 20 and between the controller 10 and the second microcomputer 30. In the present embodiment, the data buses operate using an identical control protocol (CAN, FlexRay) and at substantively the same transmission frequency.

The first driver (data interface driver) 21 that corresponds to the control protocol is provided, between the controller 10 and the first microcomputer 20, on the first data bus 11. The second driver (data interface driver) 22 that corresponds to the control protocol is provided, between the controller 10 and the first microcomputer 20 on the second data bus 12. The third driver (data interface driver) 31 that corresponds to the control protocol is provided, between the controller 10 and the second microcomputer 30, on the first data bus 11. The fourth driver (data interface driver) 32 that corresponds to the control protocol is provided, between the controller 10 and the second microcomputer 30, on the second data bus 12.

In the present embodiment, the first data bus 11 and the first driver 21 are connected by a first branch line 11a. The second data bus 12 and the second driver 22 are connected by a second branch line 12a. The first data bus 11 and the third driver 31 are connected by a third branch line 11b. The second data bus 12 and the fourth driver 32 are connected by a fourth branch line 12b.

As described above, the redundant data bus system 1 according to the present embodiment is provided with four transmission paths. Specifically, there are provided the first transmission path A for exchanging data between the controller 10 and the first microcomputer 20 through the first driver 21; the second transmission path B for exchanging data between the controller 10 and the first microcomputer 20 through the second driver 22; the third transmission path C for exchanging data between the controller 10 and the second microcomputer 30 through the third driver 31; and the fourth transmission path D for exchanging data between the controller 10 and the second microcomputer 30 through the fourth driver 32.

A description will now be given for a method for controlling the redundant data bus system 1. The controller 10 of the redundant data bus system 1 transmits an operation check signal to the first microcomputer 20 and the second microcomputer 30 through the first through fourth transmission paths A through D; receives a response signal from the first microcomputer 20 and the second microcomputer 30 through the first through fourth transmission paths A through D; and, in an instance in which there is an interruption to reception of the response signal, makes a switch, from one pathway that is connected, to another pathway.

Specifically, the controller 10 transmits an operation check signal, for checking that operation is being performed in a normal manner, from the controller 10 to the first microcomputer 20 and the second microcomputer 30 through the first through fourth transmission paths A through D. The operation check signal is transmitted, e.g., at a fixed period. The first microcomputer 20 and the second microcomputer 30 receive the operation check signal, and transmit a response signal, for indicating that operation is being performed in a normal manner, to the controller 10 through the first through fourth transmission paths A through D. The controller 10 then receives a response signal from every one of the first through fourth transmission paths A through D, and thereby checks that the first through fourth transmission paths A through D are operating normally.

In an instance in which there is a transmission path, from amongst the first through fourth transmission paths A through D, from which no response signal is received, the controller 10 determines that a defect is present in the transmission path from which no response signal has been received, and, e.g., in an instance in which the controller 10 is using the transmission path that has been determined to be defective, makes a switch to another transmission path that is operating normally. The controller 10 can be set as appropriate in regard to making a determination about defectiveness. For example, it can be determined that a defect is present in an instance in which no response signal is received within a period of transmission (fixed period) of the operation check signal, or in an instance in which there is no response for three consecutive cycles to transmission of the operation check signal.

Repair work must be carried out on a transmission path that has been determined to be defective. A description will now be given for a method for specifying (estimating) the location of the defect from the presence or absence of a received response signal.

Specifying (Estimating) Defect in First Data Bus 11 or Second Data Bus 12

In an instance in which the controller 10 does not receive a response signal from the first transmission path A and only receives a response signal from the second transmission path B, the first microcomputer 20 is operating normally, and it can therefore be specified (estimated) that a defect is present in the first data bus 11 or the first driver 21. Conversely, in an instance in which a response signal is not received from the second transmission path B, and a response signal is only received from the first transmission path A, it can be specified (estimated) that a defect is present in the second data bus 12 or the second driver 22.

Specifying (Estimating) Defect in First Driver 21 or First Branch Line 11a

In an instance in which the controller 10 does not receive a response signal from the first transmission path A but receives a response signal from the third transmission path C, the first data bus 11 is operating normally, and it is therefore possible to conclude that a cause of a fault is present between the first branch line 11a and the first microcomputer 20. In an instance in which a response signal is also received from the second transmission path B, the first microcomputer 20 is operating normally, and it can be therefore specified (estimated) that a defect is present in the first driver 21 or the first branch line 11a. A defect can be specified (estimated) in a similar manner as described above in relation to the second through fourth drivers 22, 31, 32 or the second through fourth branch lines 12a, 11b, 12b.

Specifying (Estimating) Defect in First Micro Computer 20

In an instance in which the controller 10 does not receive a response signal from the first transmission path A and the second transmission path B, and receives a response signal from the third transmission path C and the fourth transmission path D, it can be specified (estimated) that a defect is present in the first microcomputer 20 or a defect is present simultaneously in the first driver 21 and the second driver 22.

An output device may be connected to the controller 10 and the above-mentioned details of the defect (such as the location of the defect) can be outputted. It is thereby made possible for a user to perform repair work in an efficient manner.

The following effects can be obtained according to the first embodiment.

(1) Operation check signals and response signals are transmitted/received between the controller 10 and the first microcomputer 20 through the first transmission path A via the first driver 21 and through the second transmission path B via the second driver 22. In an instance in which a response signal is not received by the controller 10, it is determined that a fault has developed in the transmission path through which a response signal has not been transmitted, and a switch is made to the transmission path through which a response signal has been transmitted. Also, operation check signals and response signals are transmitted/received through the third and fourth transmission paths C, D provided with the second microcomputer 30 and connecting via the third and fourth drivers 31, 32. Therefore, even in an instance in which a defect develops in any of the transmission paths, it is possible to allow the system to continue running without stoppage.

(2) The location of the fault on the transmission path can be readily specified according to the status of reception of response signals by the controller 10 from the first through fourth transmission paths A through D. It is thereby possible to increase the efficiency of repair work.

Second Embodiment

A description will now be given for a second embodiment. First, a description will be given for a configuration of a redundant data bus system according to the present embodiment.

Figure 2:
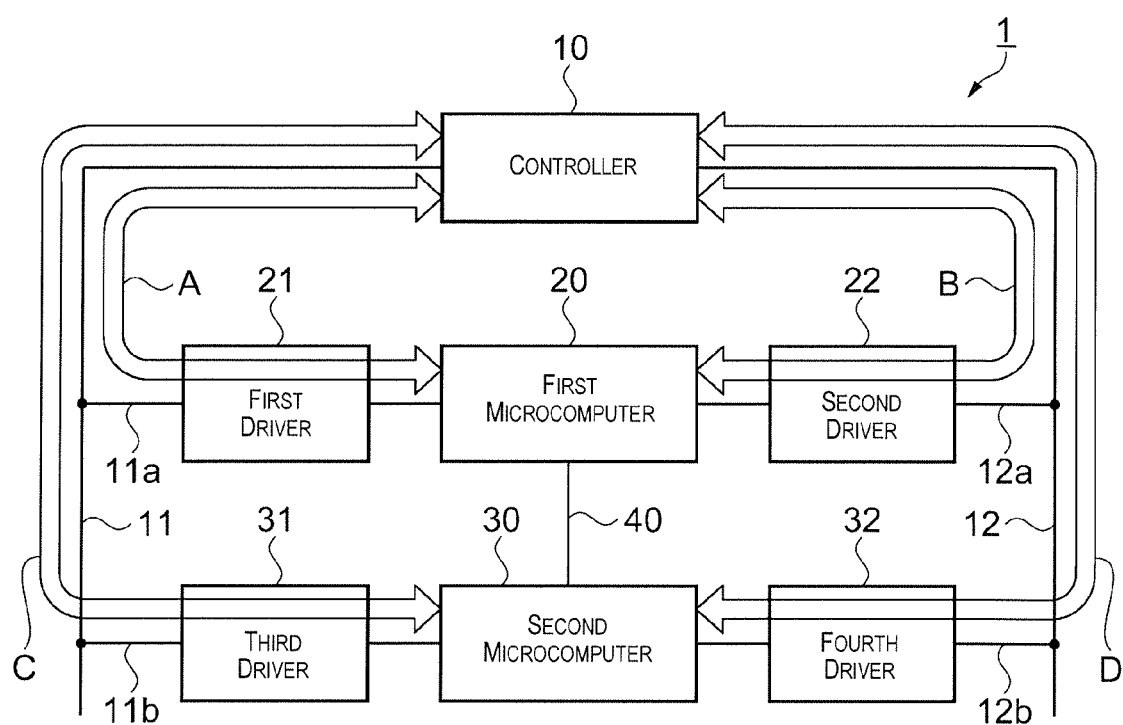
FIG. 2 is a block diagram showing a configuration of a redundant data bus system according to a second embodiment.

FIG. 2 is a block diagram showing a configuration of a redundant data bus system according to the present embodiment. The redundant data bus system 1a according to the present embodiment comprises a controller 10; a first microcomputer 20; a second microcomputer 30; a first data bus 11 over which the controller 10 and the first microcomputer 20 are connected via a first driver 21 installed between the controller 10 and the first microcomputer 20, and over which the controller 10 and the second microcomputer 30 are connected via a third driver 31 installed between the controller 10 and the second microcomputer 30; and a second data bus 12 over which the controller 10 and the first microcomputer 20 are connected via a second driver 22 installed between the controller 10 and the first microcomputer 20, and over which the controller 10 and the second microcomputer 30 are connected via a fourth driver 32 installed between the controller 10 and the second microcomputer 30; wherein there are configured a first transmission path A, along which a data signal is transmitted/received between the controller 10 and the first microcomputer 20 through the first driver 21 on the first data bus 11; a second transmission path B, along which a data signal is transmitted/received between the controller 10 and the first microcomputer 20 through the second driver 22 on the second data bus 12; a third transmission path C, along which a data signal is transmitted/received between the controller 10 and the second microcomputer 30 through the third driver 31 on the first data bus 11; and a fourth transmission path D, along which a data signal is transmitted/received between the controller 10 and the second microcomputer 30 through the fourth driver 32 on the second data bus 12.

A configuration is present in which the first microcomputer 20 and the second microcomputer 30 are connected, and in which the first microcomputer 20 and the second microcomputer 30 transmit a response signal to each other. In the present embodiment, the first microcomputer 20 and the second microcomputer 30 are connected by a data interface 40. Configuration of each of the members is similar to that in the first embodiment, and a description shall therefore not be provided.

Next, a description will be given for a method for controlling the redundant data bus system 1a. An operation check signal is transmitted from the controller 10 of the redundant data bus system 1a to the first and second microcomputers 20, 30 through the first through fourth transmission paths A through D. Upon receiving the operation check signal, the first microcomputer 20 transmits a transmission signal to the controller 10 through the first and second transmission paths A, B, and transmits a predetermined signal, indicating that the first microcomputer 20 is operating normally, to the second microcomputer 30 through the data interface 40.

The second microcomputer 30, which has received the predetermined signal from the first microcomputer 20, does not transmit a response signal to the controller 10 through the third and fourth transmission paths C, D while the predetermined signal is being received by the first microcomputer 20. In such an instance, the redundant data bus system 1a operates as a control system in which the first microcomputer 20 is driven using the first transmission path A or the second transmission path B.

In an instance in which the predetermined signal from the first microcomputer 20 is not received by the second microcomputer 30, the second microcomputer 30 transmits a response signal to the controller 10 through the third and fourth transmission paths C, D. The controller 10, upon receiving the response signal through the third and fourth transmission paths C, D, identifies that a defect has developed in the side of the first microcomputer 20 (the first and second transmission paths A, B), and makes a switch to the third or the fourth transmission path C, D. It is thereby possible to continue operating the system.

The data interface 40 may also be an interface for communicating in both directions. In such an instance, e.g., the first microcomputer 20 establishes that the second microcomputer 30 is operating normally, and the first microcomputer 20, instead of the second microcomputer 30, transmits a response signal to the controller 10. It is thus possible to reduce the frequency of use of the third and fourth transmission paths C, D, and reduce the amount of data transmitted through the first data bus 11 and the second data bus 12. In an instance in which, e.g., the data bus is of a CAN-type, in an instance of a message collision, the message associated with a lower priority according to the message ID is re-sent. However, if the number of messages sent through a transmission path is smaller, collisions become less frequent, making it possible to reduce any messages delayed as a result of re-sending.

Next, a description will be given for a method for specifying (estimating) the location of the defect. The data interface 40 is considered to be an interface for communicating in both directions. The first microcomputer 20 transmits, to the second microcomputer 30, a predetermined signal appended with information indicating the condition of the first and second transmission paths A, B. For example, in an instance in which an operation check signal has been received from both the first and second transmission paths A, B (i.e., in an instance of normal operation), a predetermined signal "0x03 (00000011b)" is transmitted. In an instance in which no operation check signal is received from the first transmission path A, "0x02(00000010b)" is transmitted. In an instance in which no operation check signal is received from the second transmission path B, "0x01(00000001b)" is transmitted. In an instance in which the first microcomputer 20 is operating normally, but no operation check signal is received from the first and second transmission paths A, B, "0x00(00000000b)" is transmitted (in an instance in which the first microcomputer 20 is defective, no signal can be received).

Upon receiving the above-mentioned predetermined signal, the second microcomputer 30 appends the above-mentioned predetermined signal to the response signal, and transmits the response signal and the predetermined signal to the controller 10 through the third and fourth transmission paths C, D. Upon receiving the response signal and the predetermined signal, the controller 10 can switch transmission paths and specify the location of the defect.

According to the second embodiment, the following effect can be obtained in addition to the effects of the first embodiment.

Since the first microcomputer 20 and the second microcomputer 30 are connected by the data interface 40, either the first microcomputer 20 or the second microcomputer 30 transmits information including the condition or the other microcomputer or the like to the controller 10 through the first and second transmission paths A, B or the third and fourth transmission paths C, D. Specifically, it is possible to cut the amount of data transmitted through the first and second transmission paths A, B or the third and fourth transmission paths C, D.

The present invention is not limited to the embodiments described above; a variety of changes or improvements can be made to the embodiments described above. An example of a modification will now be described.

First Modification Example

The redundant data bus systems 1, 1a according to the above-mentioned embodiments are provided with first and second microcomputers 20, 30, and first through fourth transmission paths A through D are configured. However, this configuration is not provided by way of limitation. For example, it is possible to add a further microcomputer and increase the number of transmission paths. It is thus possible to further enhance the system function.

Second Modification Example

Figure 3:
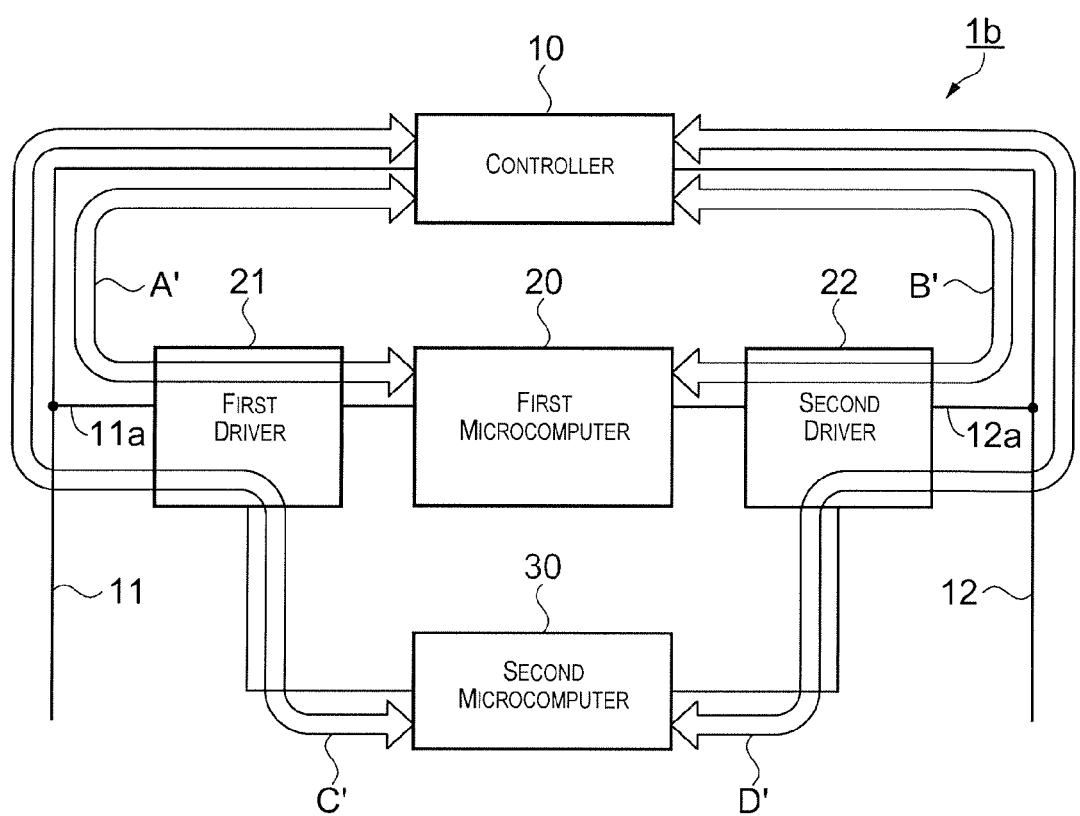
FIG. 3 is a block diagram showing a configuration according to a modification example.

In the above-mentioned embodiments, the third and fourth drivers 31, 32 are connected to the second microcomputer 30. However, the third and fourth drivers 31, 32 may be omitted. In such an instance, the first and second drivers 21, 22 may be connected to the second microcomputer 30. FIG. 3 is a block diagram showing the configuration of a redundant data bus system according to the modification example. As shown in FIG. 3, a redundant data bus system 1b comprises a controller 10; a first microcomputer 20; a second microcomputer 30; a first data bus 11 for connecting the controller 10 to the first microcomputer 20 and the second microcomputer 30 via a first driver 21; and a second data bus 12 for connecting the controller 10 to the first microcomputer 20 and the second microcomputer 30 via a second driver 22; wherein there are configured a first transmission path A', along which data is transmitted/received between the controller 10 and the first microcomputer 20 through the first driver 21 on the first data bus 11; a second transmission path B', along which data is transmitted/received between the controller 10 and the first microcomputer 20 through the second driver 22 on the second data bus 12; a third transmission path C', along which data is transmitted/received between the controller 10 and the second microcomputer 30 through the first driver 21 on the first data bus 11; and a fourth transmission path D', along which data is transmitted/received between the controller 10 and the second microcomputer 30 through the second driver 22 on the second data bus 12. A configuration is present in which the controller 10 transmits an operation check signal to the first and second microcomputers 20, 30 through the first through fourth transmission paths A' through D'; receives a response signal from the first and second microcomputers 20, 30 through the first through fourth transmission paths A' through D'; and, in an instance where reception of the response signal is interrupted, makes a switch to one of the transmission paths through which a response signal has been transmitted. Thus, even in an instance in which, e.g., the first microcomputer 20 develops a defect, it is possible to use the second microcomputer 30 and thereby continue operation of the system.

Third Modification Example

An operation check signal can be transmitted into a defective transmission path (first through fourth transmission paths A through D), even after a switch has been made to a transmission path that is operating normally. It is thereby possible to establish whether the cause of the defect is reversible, and to perform a countermeasure against noise.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A redundant data bus system comprising:
    a controller;
    a first microcomputer;
    a first data bus, over which the controller and the first microcomputer are connected via a first driver installed between the controller and the first microcomputer to form a first transmission path, along which data is transmitted/received between the controller and the first microcomputer via the first driver on the first data bus; and
    a second data bus, over which the controller and the first microcomputer are connected via a second driver installed between the controller and the first microcomputer to form a second transmission path, along which data is transmitted/received between the controller and the first microcomputer through the second driver on the second data bus;
    the controller being configured to transmit, to the first microcomputer via the first transmission path or the second transmission path, the data including an operation check signal, and to receive, from the first microcomputer via the first transmission path or the second transmission path, the data including a response signal, and
    the controller being further configured to make a switch to one of the first and second transmission paths through which the response signal has been transmitted when reception of the response signal is interrupted.

2. The redundant data bus system according to claim 1, further comprising
    a second microcomputer,
    the first bus connecting the controller and the second microcomputer via a third driver installed between the controller and the second microcomputer to form a third transmission path along which data is transmitted/received between the controller and the second microcomputer via the third driver on the first data bus,
    the second bus connecting the controller and the second microcomputer via a fourth driver installed between the controller and the second microcomputer to form a fourth transmission path along which data is transmitted/received between the controller and the second microcomputer via the fourth driver on the second data bus, and
    the controller being further configured to transmit, to the second microcomputer via the third transmission path or the fourth transmission path, the data including an operation check signal, and to receive, from the second microcomputer through the third transmission path or the fourth transmission path, the data including a response signal, and
    the controller being further configured to make a switch to one of the third and fourth transmission paths through which the response signal has been transmitted when reception of the response signal is interrupted.

3. The redundant data bus system according to claim 2, wherein
    the first microcomputer and the second microcomputer are connected, and
    the first microcomputer and the second microcomputer transmit/receive data with respect to each other.

* * * * *